United States Patent
Hamatschek et al.

(10) Patent No.: US 8,402,729 B2
(45) Date of Patent: Mar. 26, 2013

(54) VEHICLE AND METHOD FOR HARVESTING ESPALIER FRUIT, ESPECIALLY BERRIES OR GRAPES

(75) Inventors: Jochen Hamatschek, Oelde (DE); Frank Schauz, Oelde (DE); Peter Schöttler, Oelde (DE); Hans-Joachim Beyer, Ennigerloh (DE); Dominik Zielke, Ennigerloh (DE); Michael Erbach, Niederkumbd (DE); Tilo Hühn, Schönenberg (CH)

(73) Assignees: Westfalia Separator AG, Oeide (DE); Ero-Geratebau GmbH, Niederkumbd (DE); Hochschule Wadenswil, Wadenswil (CH)

( * ) Notice: Subject to any disclaimer, the term of this patent is extended or adjusted under 35 U.S.C. 154(b) by 511 days.

(21) Appl. No.: 11/597,995

(22) PCT Filed: Jun. 15, 2005

(86) PCT No.: PCT/EP2005/006381
§ 371 (c)(1), (2), (4) Date: Aug. 22, 2008

(87) PCT Pub. No.: WO2005/122746
PCT Pub. Date: Dec. 29, 2005

(65) Prior Publication Data
US 2008/0302078 A1  Dec. 11, 2008

(30) Foreign Application Priority Data
Jun. 17, 2004  (DE) .......................... 10 2004 029 394

(51) Int. Cl.
*A01D 46/00* (2006.01)

(52) U.S. Cl. ............... 56/330; 56/328.1; 494/53; 494/60

(58) Field of Classification Search ............ 56/233–237, 56/328.1; 460/133; 494/53, 60
See application file for complete search history.

(56) References Cited

U.S. PATENT DOCUMENTS

| | | | | |
|---|---|---|---|---|
| 2,597,673 A * | 5/1952 | Ritter et al. | ...................... | 460/8 |
| 2,795,635 A * | 6/1957 | McBride | ................... | 210/380.1 |
| 2,823,126 A * | 2/1958 | Little | ........................... | 426/422 |
| 3,368,684 A * | 2/1968 | Ruegg | ............................ | 210/374 |
| 3,713,887 A | 1/1973 | Stimson | | |
| 4,016,711 A * | 4/1977 | Claxton | ........................ | 56/330 |
| 4,109,448 A * | 8/1978 | Kline | .............................. | 56/13.5 |
| 4,287,708 A * | 9/1981 | Neely, Jr. | ...................... | 56/13.5 |
| 4,325,209 A * | 4/1982 | Cicci | .................................. | 56/1 |
| 5,656,180 A * | 8/1997 | Pieralisi | ...................... | 210/781 |
| 6,502,380 B1 * | 1/2003 | Merant et al. | ................... | 56/330 |

FOREIGN PATENT DOCUMENTS

| DE | 2 003 324 | 10/1971 |
|---|---|---|
| DE | 25 19 120 A1 | 3/1976 |
| DE | 33 43 602 A1 | 6/1985 |

(Continued)

*Primary Examiner* — Alicia Torres
(74) *Attorney, Agent, or Firm* — Barnes & Thornburg LLP (57) ABSTRACT

A vehicle for harvesting espalier fruit, such as berries or grapes, and for further processing to a must on the vehicle. The vehicle comprises a frame configured to reach over a row of plants to be harvested in an area of a u-shaped recess of the vehicle. Also included are wheels on both sides of the u-shaped recess and arranged on the frame. Further included is a picking device to separate the fruit from a remainder of the plants. A solid-bowl screw-type centrifuge is arranged directly on the vehicle, which solid-bowl screw-type centrifuge separates and clarifies a fruit mash into at least a solids phase and a liquid phase.

21 Claims, 9 Drawing Sheets

FOREIGN PATENT DOCUMENTS

| | | | |
|---|---|---|---|
| DE | 3343602 A1 * | 6/1985 | |
| EP | 638521 A1 * | 2/1995 | |
| EP | 0 671 465 A1 | 9/1995 | |
| EP | 0 702 599 B1 | 3/1996 | |
| FR | 2 054 722 | 5/1971 | |
| FR | 2 057 600 | 5/1971 | |
| FR | 2225082 A * | 12/1974 | |
| FR | 2 786 361 A1 | 6/2000 | |
| WO | WO 01/85349 | 11/2001 | |
| WO | WO 02/089992 A1 | 11/2002 | |

* cited by examiner

VEHICLE AND METHOD FOR HARVESTING ESPALIER FRUIT, ESPECIALLY BERRIES OR GRAPES

BACKGROUND AND SUMMARY

The present disclosure relates to a vehicle for harvesting espalier fruit, such as berries or grapes, to a vehicle for harvesting olives and to a method of harvesting and further processing the espalier fruit.

Fully automatic harvesting vehicles, for example, for harvesting grapes, are known. A construction of such vehicles is used for picking the grapes off vines which are grown in rows. The method according to the present disclosure is suitable for harvesting grapes and for further processing the grapes to produce a juice or must for making wine. In addition to harvesting grapes and processing them directly in the vehicle, the present disclosure relates to the harvesting and further processing of other fruit or plant parts grown in espaliers, such as the harvesting of currants or other fruit which can be picked by a harvesting vehicle of the present disclosure. The present disclosure is described herein with relation to the harvesting and processing of grapes, but is not limited to this application.

The further processing of a crop directly on a harvesting vehicle is known. Thus, for example, the individual grapes are detached from the grape bunches by a pick-off or picking device. The grapes are then collected in a collecting or buffer tank on the vehicle and are fed to a further processing outside the vehicle. As an alternative, it is also known to drive the whole bunches of grapes to the wine producing facility.

It is a disadvantage that, in the above-described grape harvesting process in the immediately proceeding paragraph, the leaves or other undesirable plant parts as well as the seeds and skins and/or undesirable portions of the flesh of the grapes are also removed from the vineyard and are then only later separated from the grapes. It is necessary to either dispose of the excessive solid parts, or to utilize them in a different fashion, or to return them to the vineyard by another vehicle.

With respect to the state of the art, German Patent Document DE 25 19 120 A, which describes a machine for harvesting fruit, German Patent Document DE 20 03 324 A, which discloses a vehicle for pressing grapes, and U.S. Patent Document U.S. Pat. No. 3,713,887 A, which describes the processing of grapes on a vehicle under the effect of inert gas, are also cited.

In addition, it is known from German Patent Document DE 33 43 602 A1 to arrange a screw-type press on the harvesting vehicle, which compresses the fruit under the effect of pressure and dejuices them. This construction was not found to be successful, at least because the quality of the produced juice is not sufficient.

The present disclosure addresses the above-mentioned disadvantages and non-successes.

The present disclosure relates to a vehicle for harvesting espalier fruit, such as berries or grapes, and for a further processing to a juice or must on the vehicle. The vehicle comprises a frame configured to reach over a row of plants to be harvested in an area of a u-shaped recess of the vehicle. Also included are wheels on both sides of the u-shaped recess and arranged on the frame. Further included is a picking device to separate the fruit from a remainder of the plants. A solid-bowl screw-type centrifuge is arranged directly on the vehicle, which solid-bowl screw-type centrifuge separates and clarifies a fruit mash into at least a solids phase and a liquid phase. The present disclosure also relates to a vehicle for harvesting olives and for a further processing to an oil on the harvesting vehicle. The vehicle comprises a frame configured to reach over a row of plants to be harvested in an area of a u-shaped recess of the vehicle. Also included are wheels on both sides of the u-shaped recess and arranged on the frame. Further included is at least one device for separating olives from plants. A solid-bowl screw-type centrifuge is arranged directly in the vehicle, which solid-bowl screw-type centrifuge is used to separate and clarify an olive mash into at least a solids phase and a liquid phase. The present disclosure also relates to a method of harvesting and further processing espalier fruit, such as berries or grapes, using the vehicle according to Claim 1. The method step comprises processing the fruit by separating and clarifying a mash of the fruit into at least a solids phase and a liquid phase, the separating and clarifying taking place on the vehicle.

Accordingly, a solid-bowl screw-type centrifuge, also called a decanter, is arranged in the harvesting vehicle and is used for the separation and/or clarification of a fruit mash at least into a solid phase and a liquid phase.

In contrast to a use of a screw-type press, in the solid-bowl screw-type centrifuge of the present disclosure mechanical stressing of the crop is low and no time delay occurs in the processing. This reduces possible undesirable influences of microorganisms or the influences of substances including plant parts, such as stems and leaves, and also contributes to the reduction of undesirable crop-related enzyme influences.

The vehicle of the present disclosure is suitable for harvesting grapes but can also be used for other fruit.

According to the present disclosure, the screw-type centrifuge is arranged directly on or in the vehicle, such as a self-propelled full-range harvester. If the harvester is designed as a grape harvesting vehicle, the dejuicing can take place directly in the vineyard still on the vehicle during the harvesting drive. An analogous situation applies to the disposal of the marc and the rape in the vineyard which, after being discharged from the solid-bowl screw-type centrifuge, can immediately be worked into the ground as fertilizer, for example, directly by the tires. Since the screw-type centrifuge is a continuously operating machine, the discharge also takes place continuously.

The vehicle and method according to the present disclosure are suitable for obtaining a juice and/or must, for example, when producing wines of all types, such as white wine, rose, and for producing basic champagne wine. Its use is conceivable even for red wine, possibly in connection with additional processing steps directly on the vehicle or after emptying the tank for the obtained must. A suitability for the harvesting and processing of red wine can be achieved by a combination of the method according to the present disclosure with a step of a thermal or non-thermal method for the extraction of coloring, such as electroporation.

The costs of the harvesting and the further processing are clearly lowered by the vehicle and method of the present disclosure. During the harvesting and processing of grapes, a further processing by a press and or solid-bowl screw-type centrifuge in the wine producing facility are eliminated. Thus, on the one hand, the investments of the wine producing facility can be reduced and, on the other hand, the required personnel expenditures for obtaining grape must are lowered. It is also advantageous that the transport volume of the wine producing facility is lowered and that the possibly required return transport of the rape from the wine producing facility into the vineyard is eliminated.

An optional possibility of a continuous fining and/or enzymation of the must directly on the full-range harvester, such as in a continuous process, arising as a result of the solid-bowl screw-type centrifuge is also advantageous.

Because of its method of operation, the screw-type press of German Patent Document DE 33 43 602 A1 represents no centrifuge but a classical, conical press which is based on the operating principle of pressing out compressible substances. In contrast, according to the present disclosure, the obtaining of must takes place at an acceleration in the centrifugal field from more than 1,000 g that is, 1,000 times the gravitational acceleration) to more than 2,000 g. A screw-type press ensures a continuous operation on the vehicle. In relation, for example, to DE 33 43 602, a result of the narrowing of the conical housing and the damming effect of the outlet head, the crop is compressed, so that a compressive pressure acts upon the grapes, which leads to a pressing-out of the grapes. A clarifying effect cannot be achieved by such a construction. In particular, the cooler sludge content to be achieved when processing grapes is unsatisfactory. However, a cooler sludge content of less than 1% by volume, for example, a secondary cooler sludge is achieved by a decanter on the harvesting vehicle of the present disclosure. This permits, if desired, the elimination of a removal of slime. More extensively than the screw-type press, the decanter avoids the extraction of undesirable parts because a press exercises a very compressive pressing force on all parts of the fruit, for example, also on stems and seeds. The pressing effect also occurs as well by the effect of the sieve element, which causes the occurrence of mechanical damage, and which has a disadvantageous effect on the cooler sludge content and generally on the quality of the must. The cooler sludge content is influenced mainly by the sieve design of the press, because fruit parts are pressed through the perforation of the sieve plates as a result of the pressures.

As a rule, when producing wine, a grinding of the fruit before the processing by the decanter is not required. In contrast to the screw-type press, by the solid-bowl screw-type centrifuge being directly on the vehicle, clearly better must qualities can be achieved. This makes the use of the decanter meaningful, especially since the safety aspects are better than expected and critical situations, for example, by the use of a catching device for the drum, can almost be excluded.

Since screw-type presses rotate only very slowly, they are not critical from a safety-related point of view. This is probably one reason why the use of rapidly rotating centrifuges on harvesting vehicles had so far not been considered for harvesting fruit or the like grown on espaliers. The quality of the wine is also disadvantageous. In addition, the yield of the screw-type press is less than that of a decanter, which is another advantage of the decanter because, for example, the making of fewer trips. Further, the decanter is more hygienic because it also represents a closed system. The decanter additionally reliably discharges solids, such as dust, which it had previously separated, whereas these may be led into the must by the screw-type press. Furthermore, the achievable throughput at the decanter on the vehicle is also higher.

When the existing hydraulic system of the vehicle is utilized as the driving system, a cost-effective implementation of the drive of the solid-bowl screw-type centrifuge becomes possible. In addition, an easy controllability of the drive or of the two drives of the screw as well as of the drum is permitted. Advantageously, the efficient hydraulic aggregate, which is present anyhow on grape harvesting vehicles, can be utilized here, which hydraulic aggregate, in turn, is also used for driving one or two hydraulic motors, by which the drum and the screw of the solid-bowl centrifuge are driven. Other driving concepts, such as electric motors, gas, diesel or hybrid aggregates or the like are also conceivable.

Since the solid-bowl screw-type centrifuge is a high-speed centrifuge with a high potential for rotational energy, different safety characteristics are implemented for the protection of the operating personnel and of the driver of the harvesting vehicle. First, a safety catching device is installed (see FIG. 6).

The safety catching device includes metal plates and/or holding clips consisting of struts, which form a catching cage. The catching cage surrounds the drum completely or at least partially and is fastened as a separate device inside the hood or centrifuge housing and/or is constructed as a component of the hood and of the centrifuge housing. This advantageous "emergency bearing" of the drum for the event of a failure of the drum bearing, for example, roller bearings ensures that the rotating drum cannot become detached from the vehicle. However, if the drum became detached from the bearings, it remains in the safety catching device, where it can finish rotating in a simple and secure manner without direct danger to the operating personnel.

So that the hood cannot detach from the centrifuge frame even by an effect of severe force, holding clips are mounted in a distributed manner along the circumference, that is along the partition line of the hood and the frame.

In addition, the feet and spring elements are constructed as "tear-resistant" oscillating elements, so that a detaching of the solid-bowl screw-type centrifuge from the vehicle frame is securely prevented also in the event of damage.

Furthermore, the safety catching device includes bent metal plates or flat-iron holding clips. Those plates or clips reach over the bearing housing and are arranged on the left and the right of the drum outside the hood space or housing space of the solid-bowl screw-type centrifuge and are fastened to the frame of the centrifuge.

Although experimentation took place in the past by using a centrifuge on a harvesting machine, such as a potato harvesting machine, this solution was not successful in practice because there were reservations with respect to safety. These reservations also spoke against a use on harvesting machines for espalier fruit, for example, harvesting machines for berries or grapes. Such machines are often used on slopes of considerable inclinations and theoretically may even overturn if they are subjected to extremely faulty driving.

The use of the solid-bowl screw-type centrifuge is therefore even more remarkable, especially on the complicated and particularly high grape harvesting machine. This application is made possible at least by the skillful arrangement of a lateral U-shaped recess in the base frame for reaching over a row of plants, such as vines. It is also made possible at least as a result of the safety catching device as an additional safety device. The safety catching device, even in the improbable case of an overturning of the harvesting vehicle, or in the event of a failure of the bearing, ensures a safe rotating of the drum to a standstill.

Hoods for protecting the drum and as a protection against contact are also known from stationary use. These are not designed such that, as a drum is becoming detached from its anchoring, they can hold the drum in their interior. This is a significant difference between known hoods and for example, the tube-shaped safety catching devices provided in addition to the hoods, according to the present disclosure.

The solid-bowl screw-type centrifuge of the present disclosure is arranged on the vehicle such that it can always be horizontally or vertically aligned by a tilting device alone or together with the vehicle body as a function of the inclined position of the row of vines to be harvested.

It would also be conceivable to develop the solid-bowl screw-type centrifuge as a centripetal pump machine in order to achieve a pumping effect. In this case, the centripetal pump delivers the clarified must on the liquid side of the centrifuge to the next station in a processing sequence, for example, into the must collecting tank without any additionally required pump.

The harvesting vehicle may have one or more buffer or collecting tanks which are connected directly to the input or output side of the solid-bowl screw-type centrifuge. The tanks facilitate the controllability of the process, and also a pump, for the simple and particularly rapid "speed evacuation" of the buffer or collecting tank.

It is also advantageous, according to the present disclosure, for the solid-bowl screw-type centrifuge to be arranged on the vehicle such that a horizontal alignment of the solid-bowl screw-type centrifuge is essentially or precisely ensured also on a slope, for example, an inclination smaller than 3° with respect to the horizontal. This is because the vehicle body can be swiveled with the solid-bowl screw-type centrifuge by a tilting device relative to the wheels.

As mentioned above, the present disclosure also relates to a vehicle for harvesting olives and for their further processing to oil on the harvesting vehicle. The vehicle includes a frame designed for reaching over a row of plants to be picked in the area of a u-shaped recess of the vehicle. The vehicle also includes a wheel arranged on the frame on both sides of the u-shaped recess and at least one device for separating the fruit from the plants. Further included is a screw-type centrifuge, such as a solid-bowl screw-type centrifuge, arranged directly in the harvesting vehicle. The centrifuge is used for the separation and clarification of an olive mash into at least an oil phase and a water phase. The olive oil is obtained from the olives as required, after a pretreatment, such as a coring and/or grinding or the like. The obtaining of the oil is done directly on the harvesting vehicle in a decanter from a fruit mash, for example, in a two- or three-phase process. The two-phase process is oil/water-solids and the three-phase process is oil/water/solids.

The safety catching device is designed for catching the rotating drum in the event of a disturbance or for ensuring a rotating or running of the drum to a stop inside the safety catching device without any detaching of the drum from the vehicle.

Other aspects of the present disclosure will become apparent from the following descriptions when considered in conjunction with the accompanying drawings.

DETAILED DESCRIPTION

Figure 1:
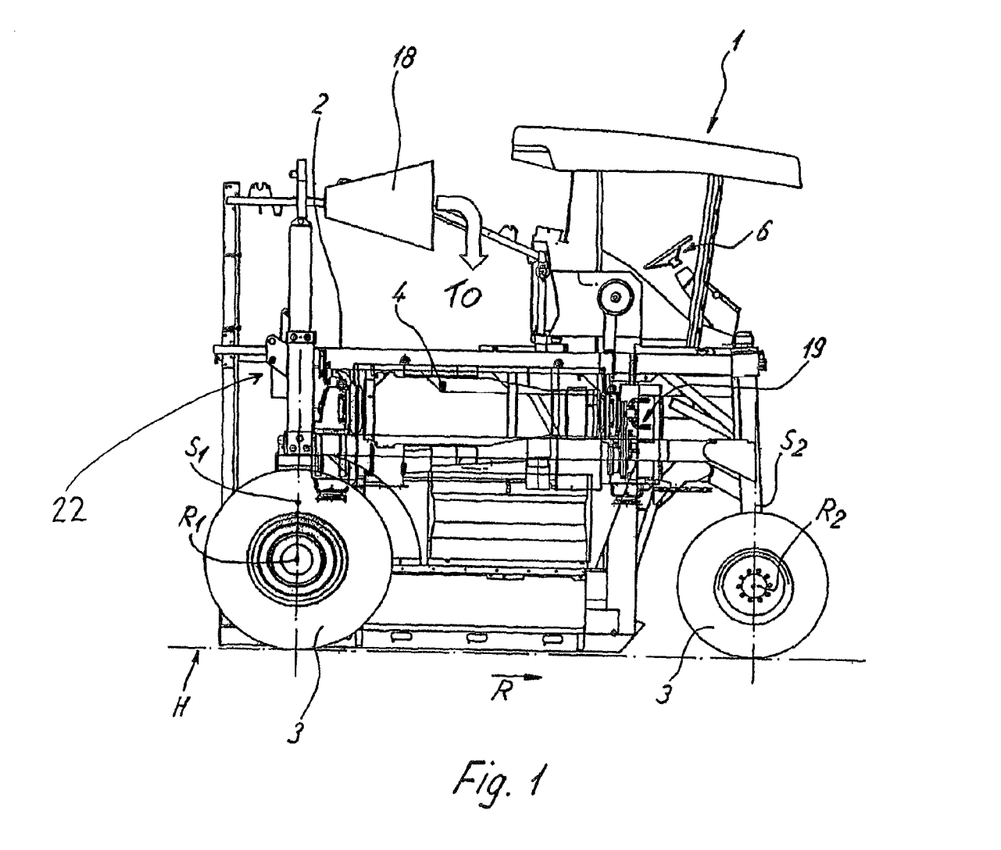
FIG. 1 is a lateral view of a harvesting vehicle having a solid-bowl screw-type centrifuge for the harvesting of grapes, according to the present disclosure.

FIG. 1 illustrates an embodiment of a harvesting vehicle constructed as a grape harvesting vehicle 1. Vehicle 1 is designed for harvesting grapes from plants, such as a row of vines, and for further processing the harvested grapes. The present disclosure applies to espalier fruit harvesting machines, including harvesting machines for berries or grapes.

The vehicle 1 is designed as a self-propelled driven vehicle having a powerful drive. Designs as a trailer or as a combination of a tractor and a trailer or semitrailer are also conceivable.

Figure 2:
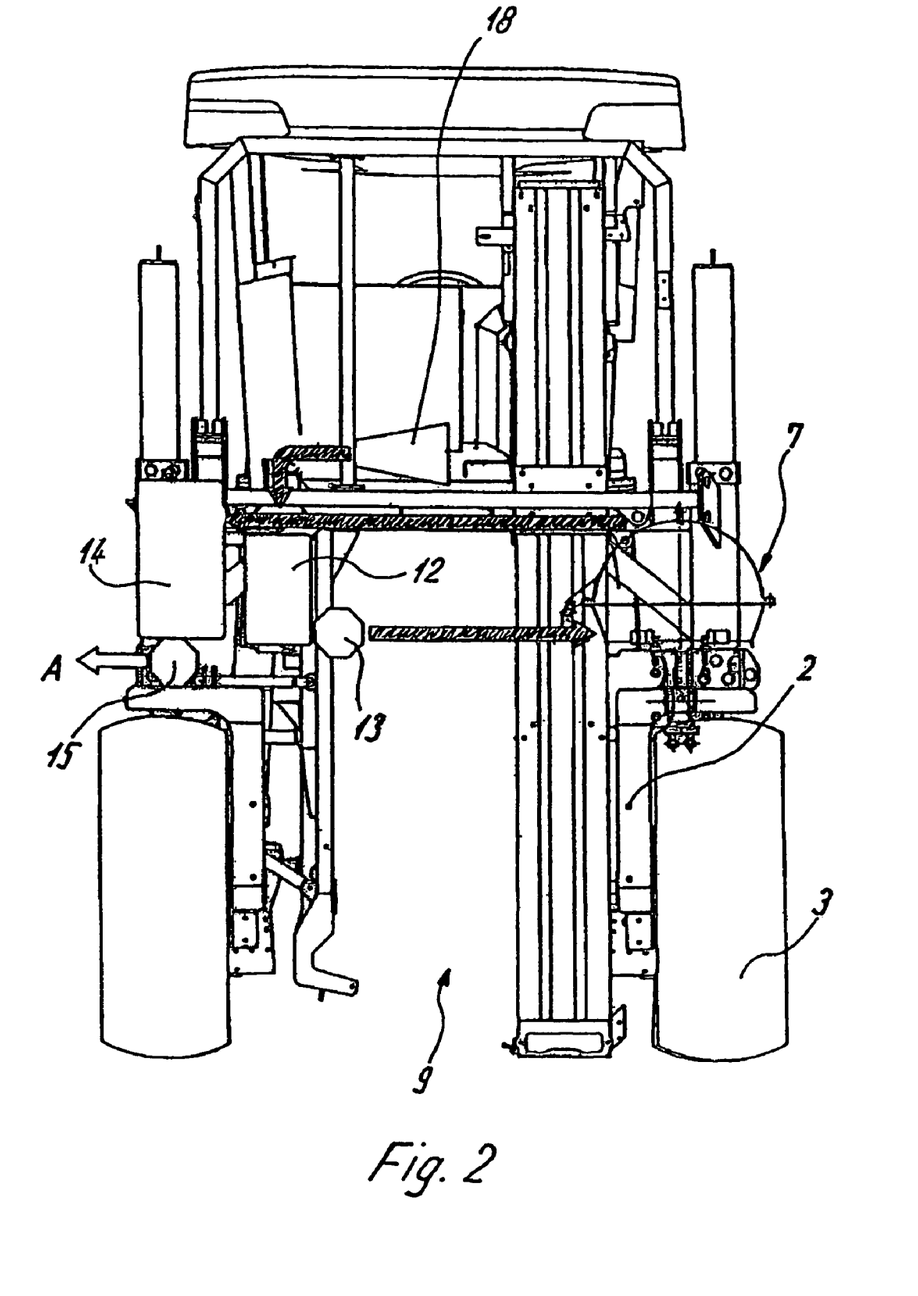
FIG. 2 is a rear view of the grape harvesting vehicle according to FIG. 1, including the decanter.

The harvesting vehicle 1 has a frame 2 which is designed such that it reaches over vines of a row of vines to be harvested transversely to a longitudinal direction R of the vehicle 1. Vehicle 1 includes a U-shaped recess 9 (see FIG. 2). For example, on the frame 2, two wheels 3 are situated spaced-apart from one another in the driving direction R (see FIG. 1) and are arranged to be on both sides of the vines (not shown). It is also conceivable to select a drive by at least one pair of chains instead of the wheels 3. In the case of a soft critical ground, a vehicle 1 with chains (not shown) will not sink in as deeply as a vehicle 1 with wheels 3.

The harvesting vehicle 1 comprises a device for separating bunches of grapes from the vines, which is known (not shown). The vehicle 1 also includes a picking device 18 which detaches individual grapes from the grape bunches (not shown).

Figure 3:
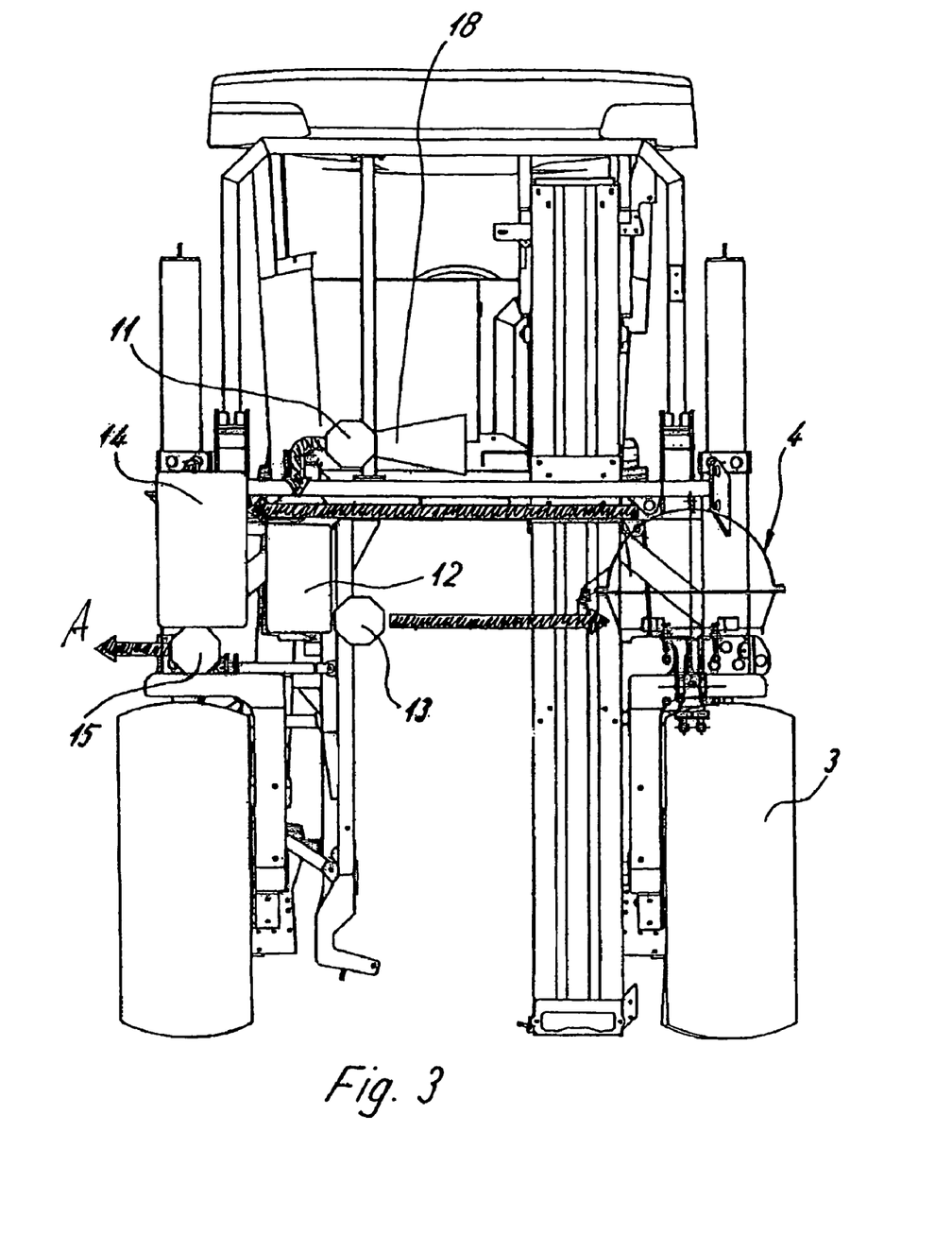
FIG. 3 is a rear view of another embodiment of a harvesting vehicle for harvesting grapes or berries, including a decanter and a grinding device, according to the present disclosure.
Figure 6:
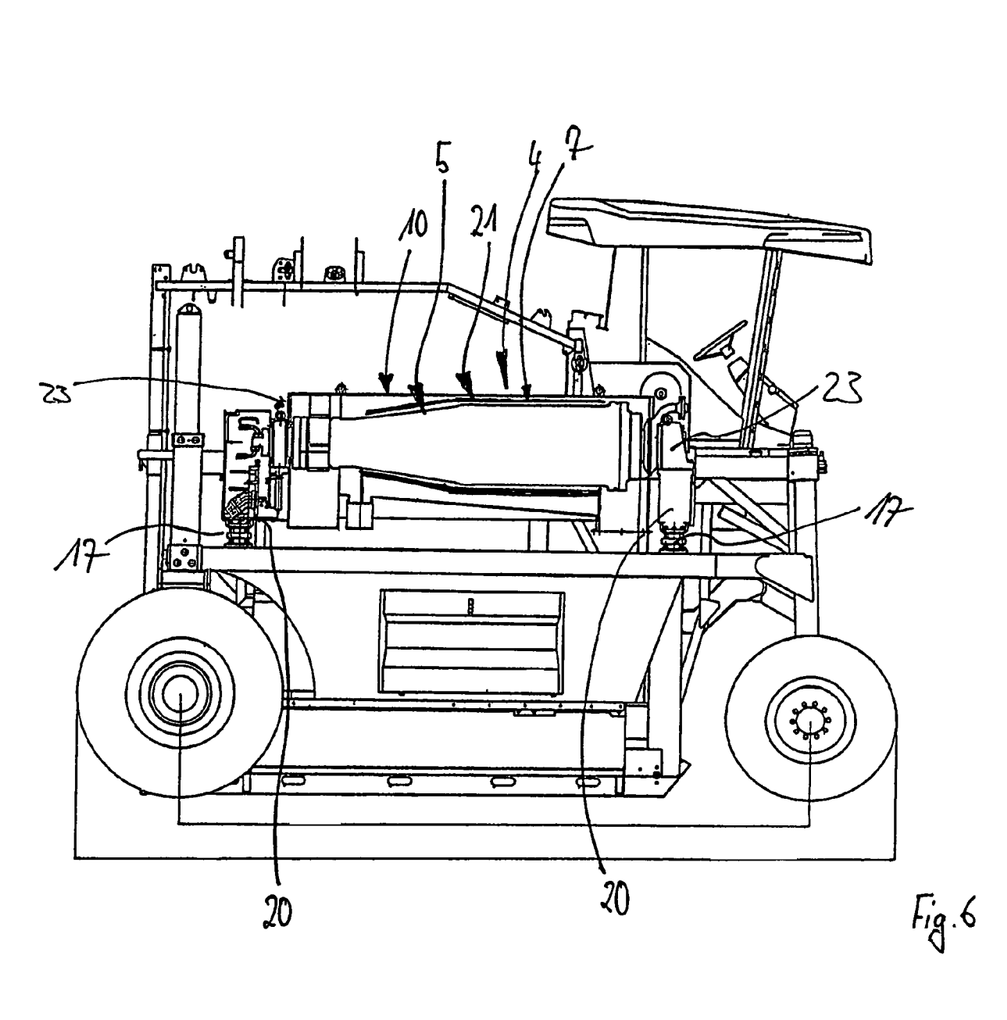
FIG. 6 is lateral view of another embodiment of a harvesting vehicle including a decanter installed in a different position, according to the present disclosure.

The grapes obtained in this manner are directly or by way of picking device 18 and/or by way of a grinding device 11 (see FIG. 3, showing an embodiment processing other harvested crops, such as fruit, which is ground first), and/or by way of one or more buffer tanks 12 (e.g., mash buffer tank), and/or a pump 13 are fed into a solid-bowl screw-type centrifuge 4 having a solid-bowl drum 5 (see also FIG. 6). In centrifuge 4, a separation and clarification of the must takes place, such as from the rape, that is, from the skins and, if applicable, seeds and/or other parts. Feeding pipes and discharge pipes are shown schematically in the Figures by arrows, unless the arrows are otherwise identified. A feeding from the buffer tank 12 takes place through one of the pipes into the centrifuge 4.

Rape delivered from a solids discharge of the solid-bowl screw-type centrifuge 4 can be returned into the vineyard either in a collected or direct manner. Whereas, the must discharged from a liquid discharge of the solid-bowl screw-type centrifuge 4 is collected in a collecting or must tank 14 at the harvesting vehicle 1 and is then guided to further processing (see FIG. 5). The discharge from the collecting tank 14 takes place by a rapidly evacuating pump or must pump 15.

During a harvesting, the wheels 3 of the vehicle 1 stand on the ground on both sides of the plants of a row to be harvested, such as vines of a row of vines, so that the frame 2 reaches over the row of vines.

The driver sits above the frame 2 directly over the row of vines in a driver's cab 6.

In contrast, the solid-bowl screw-type centrifuge 4 is arranged laterally of or across the row of vines or of the U-shaped recess 9 on the frame 2 above the wheels 3. Centrifuge 4 is situated between perpendicular lines S1, S2 with respect to horizontal line H which extends through the two wheel axles R1, R2. Other types of arrangements of the decanter, or centrifuge 4 are conceivable, such as directly on the frame, or between wheels in order to mount the weight of the decanter as low as possible on the vehicle.

Generally, the solid-bowl screw-type centrifuge 4 is installed on the vehicle 1 with a horizontal axis of rotation. However, an installation with a perpendicularly arranged axis of rotation is also conceivable.

FIG. 1 also shows a tilting device 22 for tilting the vehicle body relative to the wheels 3 on a slope.

The solid-bowl screw-type centrifuge 4 is driven, for example, by a hydraulic system present on the vehicle 1 by one or two hydraulic motor(s) 19. Such an arrangement can be implemented in a cost-effective and manner and in a compact construction. However, other drives are also conceivable.

For ensuring sufficient safety in the event of a disturbance, the drum 5 of the solid-bowl screw-type centrifuge 4 is arranged on the frame 2 in a type of safety catching device 7 (see FIG. 6), which is designed for catching the rotating drum in the improbable case of a detaching of the solid-bowl screw-type centrifuge 4 from its anchoring or from its bearings and to ensure a rotating to a stop or coming to a stop of the drum 5 inside the catching device 7 without any detaching of the drum 5 from the vehicle 1.

In a manner known, the drum 5 is surrounded by a hood 10, for example, made of metal plate. It is conceivable to design the hood 10 to be so strong that it can itself act as a catching device. However, a separate arrangement is also created at least in sections between the hood 10 and the drum 5, for example, in a manner of a tube 21 (see FIG. 6). Tube 21 is adapted to an exterior contour of the drum 5, is cylindrical at least in sections, is stationary during an operation and is constructed and designed such that the drum 5 can rotate to a stop in the tube 21 even after a detaching of the drum 5 from its anchoring, which is almost impossible. The drum 5 comes to a stop inside the safety catching device 7, shown as tube 21, until its rotational energy has been consumed by a braking effect of the tube 21 and it comes to a standstill.

Metal sheets made of metal alloys are suitable as material for the tube 21 but, under certain circumstances, also plastic materials or the like and be used, which are sufficiently stable and heat-resistant and bring the drum 5 to a standstill similar to a brake. Such a tube 21 is shown in FIG. 6. Tube 21 is anchored in a stable manner directly at the frame 2 or by damping elements (not shown).

Figure 4:
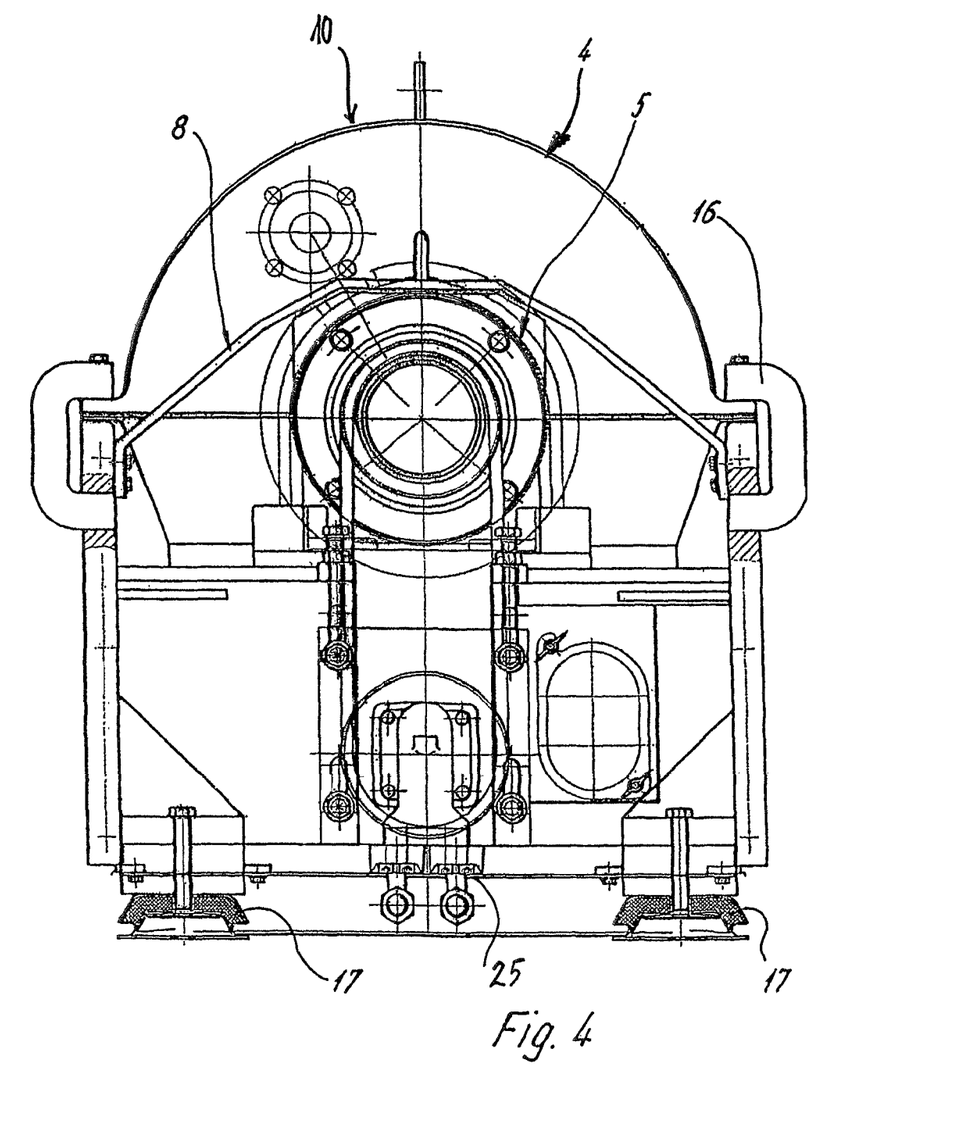
FIG. 4 is an end view of a solid-bowl screw-type centrifuge, as installed on the vehicle of FIG. 3.
Figure 7:
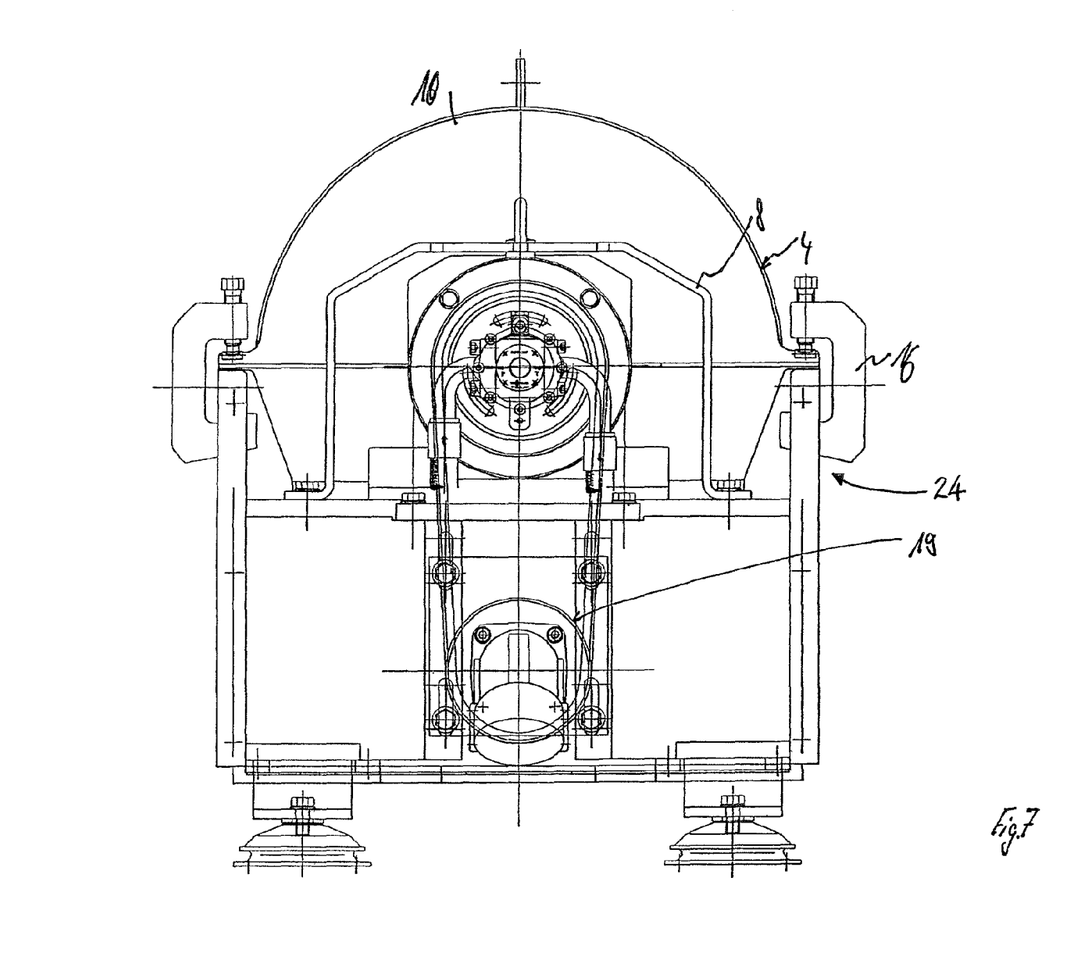
FIG. 7 is an end view of a solid-bowl screw-type centrifuge installed on the vehicle of FIG. 6.

The catching device 7 (see FIGS. 6 and 8) may also include metal plates 8 (see FIG. 7), which metal plates surround the drum 5 and/or reach around holding clips 16 made of struts, such as flat irons 24, (see FIGS. 4 and 7). Such struts, for example, in an end region of the drum 5, such as, in a region of a belt pulley for driving the drum 5 and/or a screw, surround the drum 5 or the screw or directly adjacent parts, such as a bearing housing 23 (see FIG. 6), in a protective manner. A rotary cage of the catching device 7 may also include several struts which have a correspondingly stable design (not shown).

Figure 8:
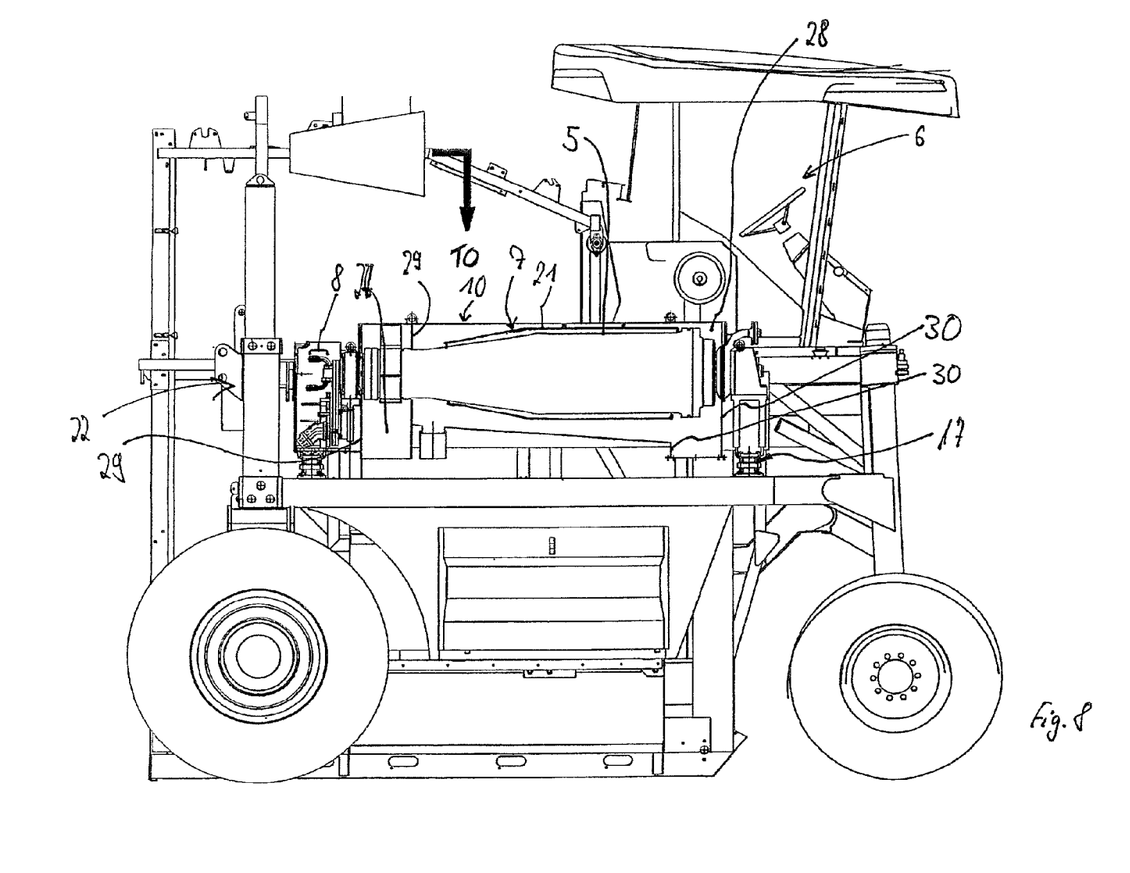
FIGS. 8 and 9 are side and rear views, respectively, of another embodiment of a harvesting vehicle, according to the present disclosure.
Figure 9:
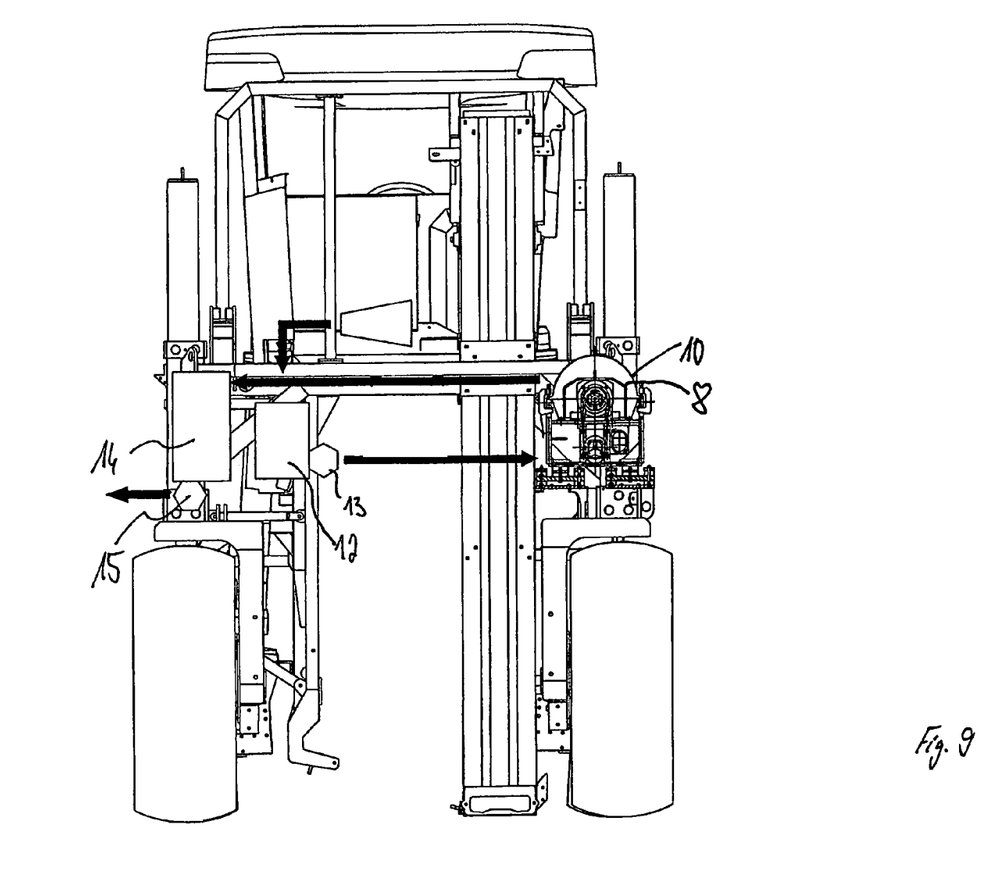

Individual struts or holding clips 16, such as flat irons, may also protect or hold and secure the bearing housing 23. This is depicted in FIG. 6. FIG. 7 shows U-shaped protective holding clips 16 made of a stable flat iron 24 and also a hydraulic line connection 25 (see FIG. 4) to a hydraulic drive/motor 19. FIG. 8 shows that boundary walls 29, 30 of the solids catching device 27 and of the liquid catching device 28 may be constructed in a reinforced manner in order to also contribute to the implementation of a collecting tube for the centrifuge 4 in combination with the tube 21.

By the clamp-type holding clips 16, individual struts or the hood 10 and a machine frame 20 for the decanter 4 are fastened to the base frame 2 or another abutment of the vehicle 1 directly or by way of damping elements 17 (see FIGS. 4 and 6).

The centrifuge 4 and/or the catching device 7, in turn, are fastened to the base frame 2 of the harvesting vehicle 1 in a manner uncoupled with respect to vibrations (see spring elements 17). Some of the metal plates 8 are trapezoidally arranged above the drum bearing 23, whereas otherwise also surrounding parts of the vehicle frame 2 can take over this function. It is also conceivable to construct a type of recess or a cage made of struts or the like of the vehicle frame itself on the vehicle frame, from which the drum 5 cannot detach.

By a surprising measure of the catching device 7, it is possible to implement the use of the solid-bowl screw-type centrifuge 4 on the vehicle 1 with a high degree of safety.

As shown in FIG. 8, a liquid discharge takes place on a right cylindrical side of the decanter 4, and a solids discharge takes place at a conical or left end of the decanter 4. Feet 17, being springs or elastic, and the bearing housings 23, which can also be secured by metal plates, are shown.

For space-saving and compact design, the buffer tanks 12 and collecting tanks 14 are provided on the mutually opposite sides of the u-shaped recess 9. However, the arrangement of the tanks 12, 14 is variable.

Figure 5:
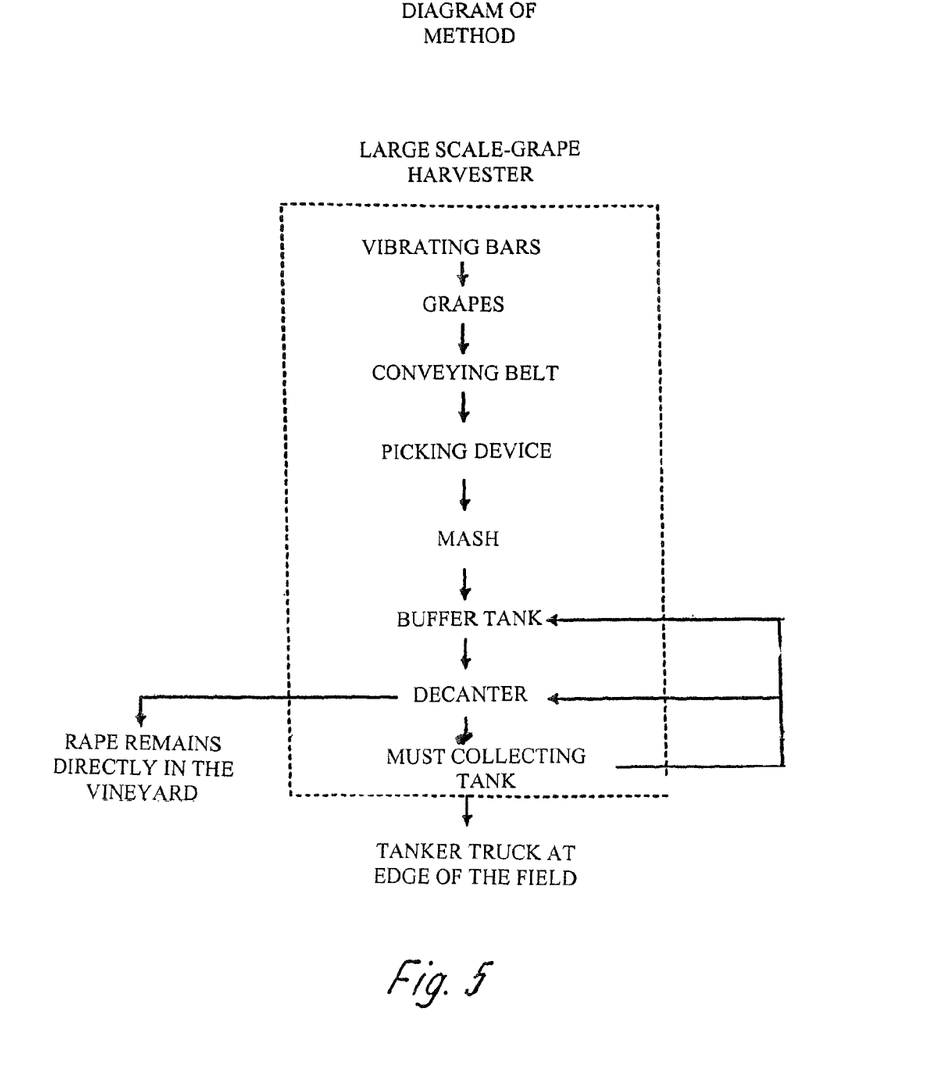
FIG. 5 is a schematic diagram of a method of harvesting and processing grapes using the vehicle of FIGS. 1 and 2.

A sequence of a harvesting and further processing method, according to the present disclosure, is illustrated in FIG. 5. For example, when harvesting and further processing grapes, a passing through the following stations or steps takes place in the method:

providing one or more of a vibrating bar, a conveying belt, a picking device 18 and a buffer tank 12;

providing a decanter or solid-bowl screw-type centrifuge 4 on vehicle 1;

providing a must collecting tank 14 on the vehicle 1; and filling a tanker truck with must (see arrow A in FIGS. 2 and 3) at an edge of the field.

An enzymation or an addition to other wine producer's additives directly at the vehicle 1 is also conceivable and has additional advantages because the processing of the obtained juice/must to wine can still be continued directly on the vehicle 1. This is advantageous because the additional steps can be carried out directly, without any loss of time, —which, on the one hand, is advantageous with respect to the quality of the wines/juices to be produced and, on the other hand, is economical.

It is also conceivable to provide a heating device (not shown) for the must on the vehicle 1 in order to be able to heat the must, for example, when producing red wine.

In addition, the rape may be separated from the must/juice in the solid-bowl screw-type centrifuge 4 and remains directly in the vineyard.

It is also conceivable that, by the use of a suitable measuring technique at the vehicle 1, parameters, such as the yield of the crop, the sugar content, the acid content, the pH value and other must parameters are detected and evaluated with respect to a precise area. This can take place, for example, in connection with a satellite-supported position finding system, such as the GPS or Global Positioning System.

A cleaning of the system, such as the centrifuge 4, takes place in a simple manner by a type of cleaning-in-place system.

In addition, analyses of the must and/or of the starting materials as well as an intelligent controlling of the harvesting are also conceivable on board the vehicle 1.

A cooling on the vehicle 1 is optionally also conceivable as well as a controlled utilization of the retention time of the must on the vehicle 1 for reactions in the must.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A vehicle for harvesting espalier fruit including berries or grapes, and for a further processing to a juice or must on the vehicle, the vehicle comprising:
 a frame configured to reach over a row of plants to be harvested in an area of a u-shaped recess of the vehicle;
 wheels on both sides of the u-shaped recess and arranged on the frame;
 a picking device to separate the fruit from a remainder of the plants;
 a solid-bowl screw centrifuge surrounded by a hood and having a rotatable screw and a rotatable drum arranged directly on the vehicle, which solid-bowl screw centrifuge separates and clarifies a fruit mash into at least a solids phase and a liquid phase;
 the solid-bowl screw centrifuge is arranged on the frame in a safety catching device which is configured to catch the rotatable drum in the event of a disturbance and to ensure a rotating of the rotatable drum to a stop inside the safety catching device without a detaching of the rotatable drum from the vehicle; and
 wherein the catching device is located inside the hood and concentrically surrounds the drum and acts as a catching cage.

2. The vehicle according to claim 1, wherein the solid-bowl screw centrifuge is arranged on the frame.

3. The vehicle according to claim 1, wherein the solid-bowl screw centrifuge is arranged laterally with respect to the u-shaped recess on the frame.

4. The vehicle according to claim 1, wherein the solid-bowl screw centrifuge is arranged on the frame in a longitudinal direction of the vehicle.

5. The vehicle according to claim 1, wherein the solid-bowl screw centrifuge is arranged on the frame between the wheels.

6. The vehicle according to claim 1, wherein a driving of the solid-bowl screw centrifuge takes place by a power source arranged directly on the vehicle.

7. The vehicle according to claim 6, wherein the power source includes at least one hydraulic motor which is connected to a hydraulic system of the vehicle.

8. The vehicle according to claim 6, wherein the power source includes one of a gas motor, an electric motor, a gasoline motor, a diesel motor and a hybrid motor.

9. The vehicle according to claim 1, further including at least one of a buffer tank and a collecting tank connected on one of an input and output side of the solid-bowl screw centrifuge.

10. The vehicle according to claim 9, further including at least one pump to rapidly evacuate at least one of the buffer tank and collecting tank.

11. The vehicle according to claim 1, wherein the safety catching device includes one of metal plates, holding clips and struts which, in an end region of the drum surround one of the drum and directly adjacent parts in a securing manner.

12. The vehicle according to claim 1, wherein one or both of the solid-bowl screw centrifuge and the safety catching device are fastened to the frame, the fastening including vibration dampening elements.

13. The vehicle according to claim 1, wherein the solid-bowl screw centrifuge is arranged such that one or both of the solid-bowl screw centrifuge and a vehicle body is one of horizontally and vertically aligned by a tilting device as a function of an inclined position of the row of vines to be harvested.

14. The vehicle according to claim 1, wherein the drum is configured to process grapes at a centrifugal acceleration of more than 1,000 g.

15. A method of harvesting and further processing espalier fruit, such as berries or grapes using the vehicle according to claim 1, the method step comprising processing the fruit by separating and clarifying a mash of the fruit into at least a solids phase and a liquid phase, the separating and clarifying taking place on the vehicle.

16. The method according to claim 15, further including the step of taking the solids phase directly to a harvested field.

17. A method of harvesting espalier fruit including berries or grapes, using the vehicle according to claim 1, the vehicle further including a picking device, a buffer tank, and a must collecting tank, the method steps comprising:
 separating bunches of grapes from vines in a vineyard;
 conveying the bunches of grapes to the picking device;
 separating individual grapes from the bunches of grapes using the picking device, and creating a mash;
 delivering the mash to a buffer tank;
 feeding the mash into the solid-bowl screw centrifuge;
 processing the mash by separating and clarifying the mash into a must liquid phase and a solids phase using the centrifuge;
 transferring the solids phase directly to the vineyard;
 transferring the liquid phase to the must collecting tank; and
 transferring the liquid phase to a tanker truck at an edge of the vineyard.

18. The method according to claim 17, wherein during the processing of the grapes to wine, a thermal or non-thermal coloring extraction takes place directly on the vehicle.

19. The method according to claim 17, wherein the grapes are processed at an acceleration of more than 1,000 g.

20. The method according to claim 17, wherein during the processing of the grapes, the solid-bowl screw centrifuge is adjusted such that a cooler sludge content of less than or equal to 1% by volume is reached.

21. A method of harvesting espalier fruit including berries or grapes, using the vehicle according to claim 1, the vehicle further including a picking device, a grinding device, a buffer tank, and a must collecting tank, the method steps comprising:
 separating bunches of grapes from vines in a vineyard;
 conveying the bunches of grapes to the picking device;
 separating individual grapes from the bunches of grapes using the picking device, and creating a mash;
 grinding the mash using the grinding device;
 delivering the mash to a buffer tank;
 feeding the mash into the solid-bowl screw centrifuge;
 processing the mash by separating and clarifying the mash into a must liquid phase and a solids phase using the centrifuge;
 transferring the solids phase directly to the vineyard;
 transferring the liquid phase to the must collecting tank; and
 transferring the liquid phase to a tanker truck at an edge of the vineyard.

* * * * *